Sept. 7, 1926.

H. F. WHITE 1,599,309

COMBINED BROODING AND LAYING HOUSE

Filed Oct. 10, 1924    4 Sheets-Sheet 1

Sept. 7, 1926.  
H. F. WHITE  
COMBINED BROODING AND LAYING HOUSE  
Filed Oct. 10, 1924  
1,599,309  
4 Sheets-Sheet 2

Sept. 7, 1926.

H. F. WHITE 1,599,309

COMBINED BROODING AND LAYING HOUSE

Filed Oct. 10, 1924    4 Sheets-Sheet 3

H. F. White
INVENTOR

BY Victor J. Evans

ATTORNEY

Sept. 7, 1926.
H. F. WHITE
1,599,309
COMBINED BROODING AND LAYING HOUSE
Filed Oct. 10, 1924    4 Sheets-Sheet 4
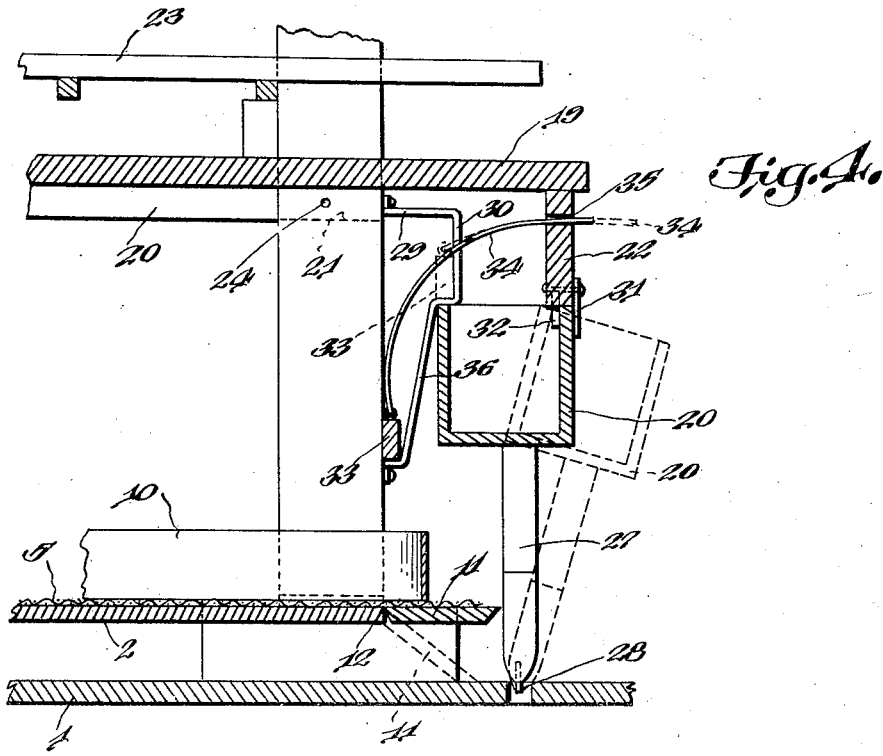
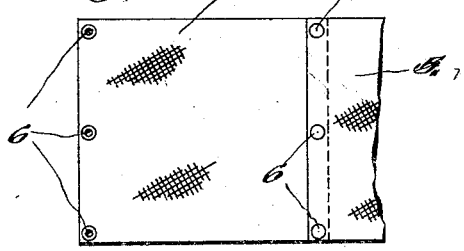

Patented Sept. 7, 1926.

1,599,309

UNITED STATES PATENT OFFICE.

HERMAN F. WHITE, OF CHICAGO, ILLINOIS.

COMBINED BROODING AND LAYING HOUSE.

Application filed October 10, 1924. Serial No. 742,856.

This invention relates to new and useful improvements in a brooding and laying house for poultry. The main object of the present invention is the provision of a combination brooding and laying house wherein the house is so constructed and arranged that it can be quickly and readily converted from a brooding house for small chicks into a laying house for hens.

Another object of my invention is the provision of a device of the above character wherein the heating of the brooding pen is so arranged as to prevent the usual huddling of the small chicks which at the present time is the cause of considerable loss by the chicks at the outer edge of the huddled group becoming chilled and in a great many instances frozen, whereas my improved heating system thoroughly heats the entire brooding pen so that the usual huddling of chicks is to a certain extent eliminated.

Another object of my invention is the provision of a device of the above character wherein novel means is provided for permitting the chicks to pass from the brooding pen into the main inclosure and return therethrough, the brooding pen being closed during the night-time so as to keep the temperature therein comparatively even throughout.

A further object of my invention is the provision of a device of the above character having therein a movable platform adapted for use when the device is used for the hens as a roosting place therefor, and which can be elevated and supported beneath the top of the housing when the device is in use as a brooding house.

A still further object of my invention is the provision of a device of the above character having novel nesting arrangements whereby the nests are pivotally mounted and can be readily tilted to a position for removing the eggs from the nest and includes means for preventing the chickens from entering the nests when so desired.

With the above and other objects in view, the invention consists in the novel features of construction, the combination and arrangement of parts hereinafter more fully set forth, pointed out in the claims and shown in the accompanying drawings, in which:—

Fig. 4 is a detail enlarged section showing the arrangement of the nesting places.

Fig. 7 is a detail plan view of the removable fabric flooring.

Figure 1:
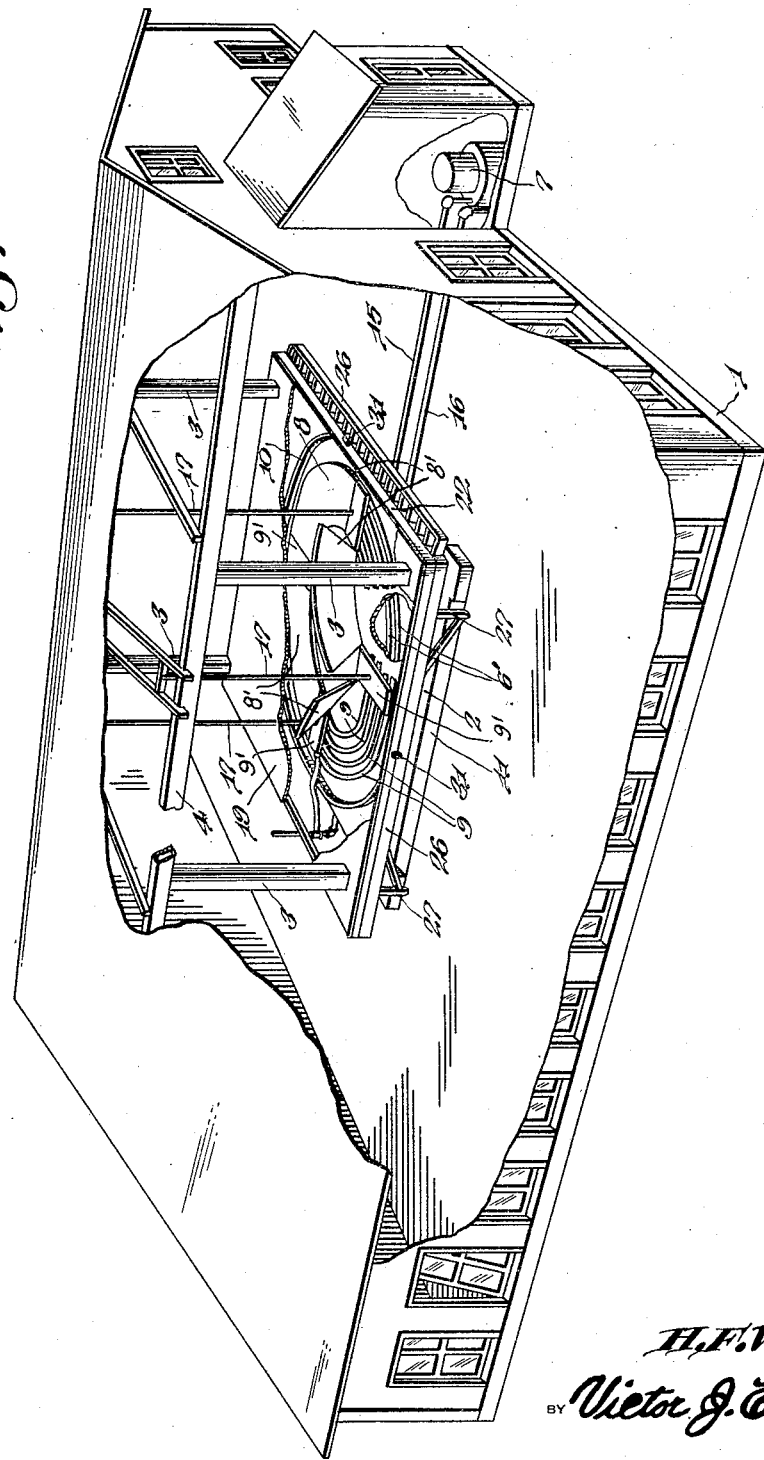
Fig. 1 is a perspective view of a combined brooding and laying house, parts thereof being broken away and additional parts being removed.

Referring now more particularly to the drawings, the numeral 1 indicates the main housing of my improved brooding and laying house. This main housing may be of any size and shape but preferably arranged in a central portion of the housing is a platform 2. This platform in the present instance is rectangular in shape and rising from each corner thereof is a supporting post 3, the upper ends of which are arranged beneath the longitudinal beams 4 and are connected thereto in any suitable manner.

The platform 2 forms the flooring for the brooding arrangement and in order to provide means whereby the flooring may be readily cleansed at the same time to provide a comparatively warm floor for the baby chicks, a removable fabric covering 5 is provided. This covering is illustrated in Fig. 7 and is preferably of a shape to correspond to the shape of the platform. Opposed sides of the covering member 5 are provided with fasteners 6 whereby when it is desired to remove one of the coverings for cleansing purposes, a clean covering member may be attached to one side of the covering member to be removed and as the covering member to be cleansed is removed from the platform, the clean covering member is simultaneously arranged in position upon the platform.

In order to keep the platform 2, which forms the flooring for the brooder, warm, the circularly arranged pipes 6' are positioned beneath the platform and are supplied with steam heat from the main heating plant 7.

Figure 3:
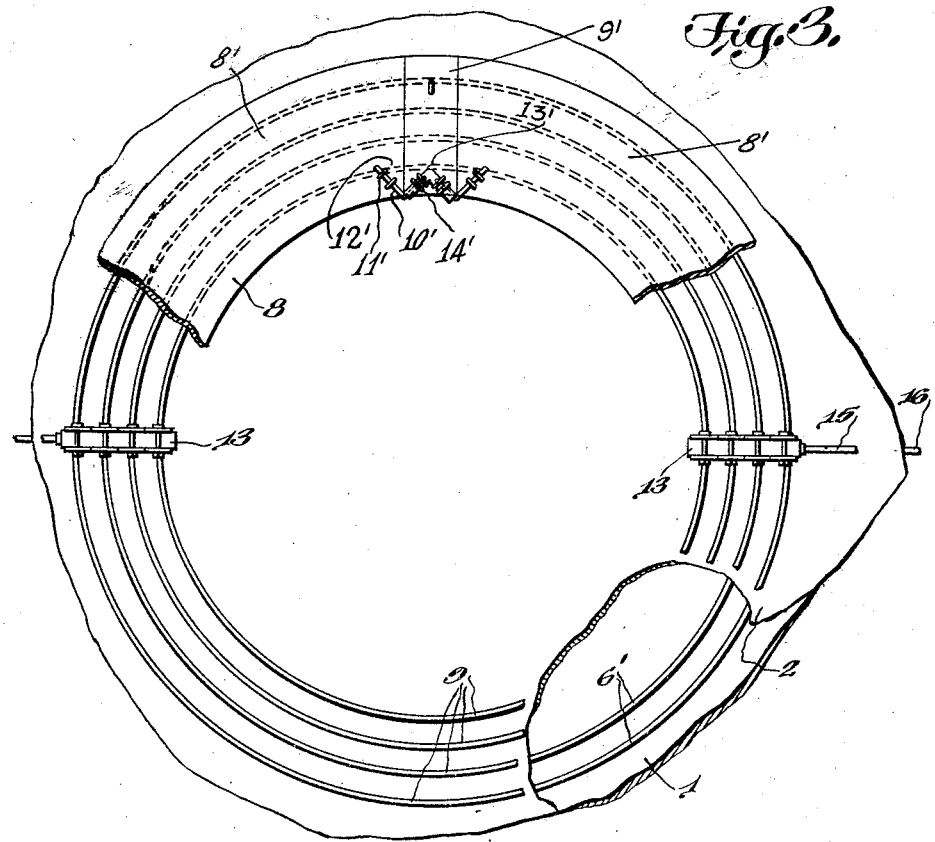
Fig. 3 is a detail plan view illustrating particularly the heating arrangement for the brooding pen and roosting place.

Arranged above the platform 2 in spaced relation therewith is the circular cover board 8 which is preferably arranged above the series of circular heating pipes 9, it being understood that the pipes 9 are arranged in spaced relation with the fabric flooring cover 5 to permit free movement of the chicks beneath the heating pipes 9. As illustrated in Fig. 1 the central portion of the platform 8 is removed to permit proper air circulation and to prevent suffocation of the chickens beneath the heating pipes 9. Also in Fig. 3 it will be noted that the platform is illustrated as made in sections 8' connected to spacing members 9' through the medium of suitable connection bolts 10' having end portions 11' secured as at 12' to the sections and having opposite end portions confined in sleeve members 13' secured to the housing as at 14'. In order to limit the movement of the chicks and not to permit them to stray too far from the heat coils, it is preferred to mount upon the platform a guard flange 10 and as illustrated in Fig. 4 this guard flange extends outwardly over a movable run board 11 which is hinged to the platform 2 as at 12 whereby the run board 11 may be dropped downwardly to an inclined position as illustrated with dotted lines in Fig. 4 to permit the chickens to pass from the platform 2 to the main housing.

Figure 5:
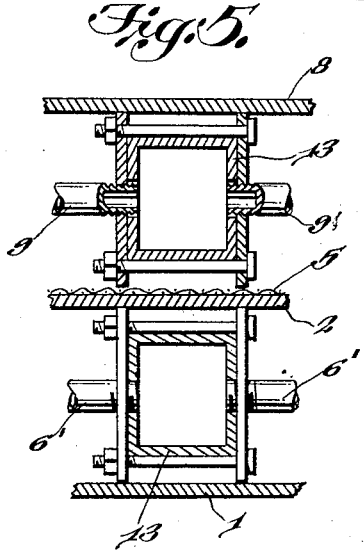
Fig. 5 is a detail transverse section on the line 5—5 of Fig. 2.
Figure 6:
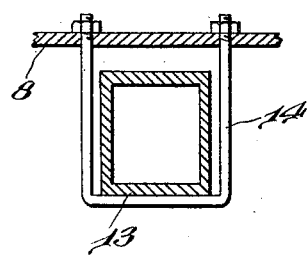
Fig. 6 is a detail transverse section thru one of the heat drums illustrating the manner in which the same is supported.

The heating pipes 6' are preferably arranged in series with the ends of the pipes of each series communicating with the drums 13 as shown in Fig. 5 and these drums are preferably supported by the circular platform 8 by means of U-shaped bolts 14 as indicated in Fig. 6. The steam supply in the pipes 6' and 9 is conveyed to the drums by means of the supply pipe 15 which leads from the heating plant 7 and the steam after passing thru the pipes is returned to the heating plant thru the pipe 16 to be reheated.

It will be noted that the circular platform 8, which covers the pipe 9 is adjustably supported by means of the rods 17 having turnbuckles 18 whereby the circular platform 8 may be raised or lowered with respect to the pipes 9 to regulate to a certain degree the heating of the brooding pen.

Arranged above the brooding pen is a roosting platform 19 which is supported upon transverse bars 20 the ends of which are fitted into the notched portions 21 of the upright members 3. The roosting platforms have a downwardly extending flange 22 on all sides thereof and mounted upon the platform 19 are the usual roosting rails 23.

When the device is in use as a brooding house, the roosting platform 19 may be moved upwardly to a position adjacent the top of the upright members 3 and suitable supporting members pass thru the openings 24 in the bars 20 and thru the openings 25 in the uprights 3 for supporting the platform 19 in a raised position.

Figure 2:
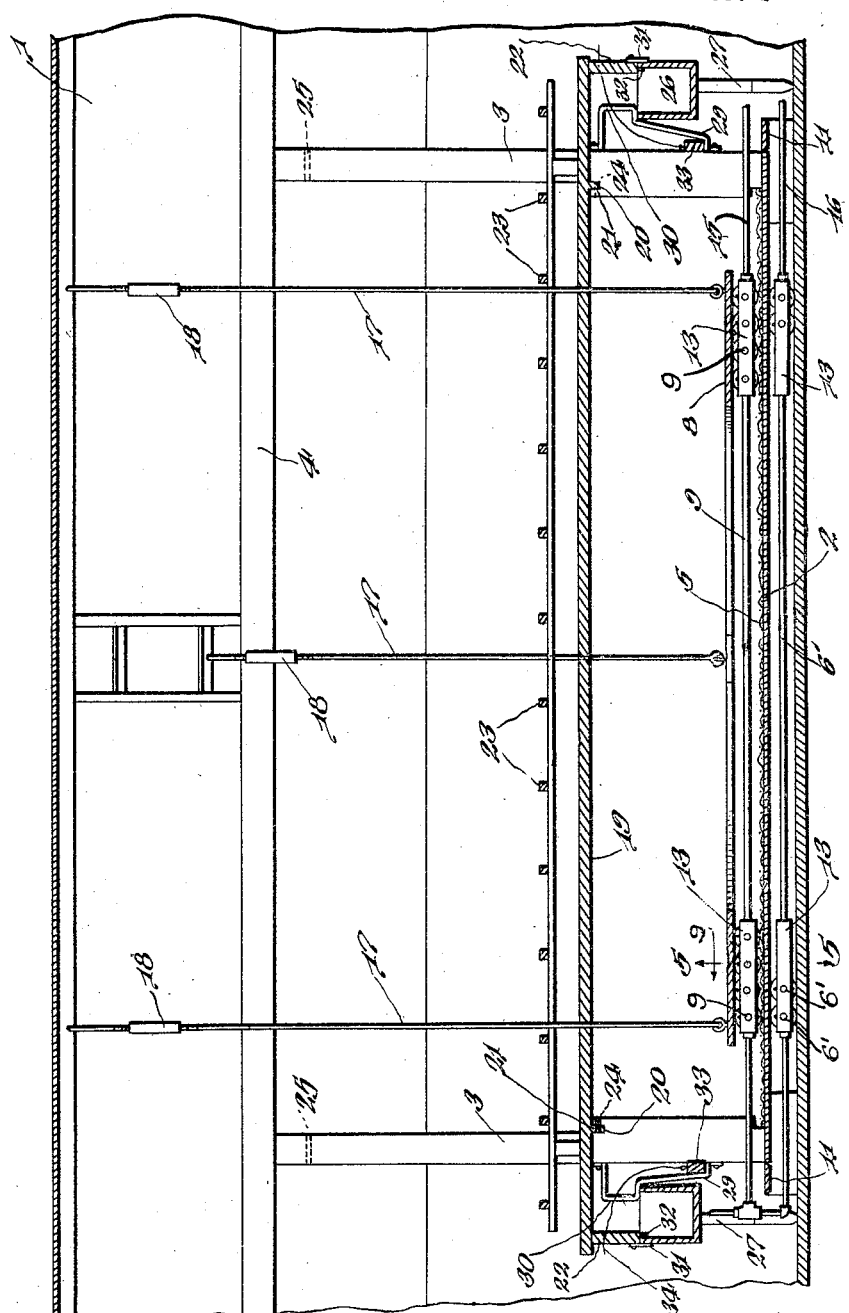
Fig. 2 is a detail longitudinal section.

In order to provide for suitable nesting places when the device is used for a laying house for hens, I provide a longitudinal series of nesting places formed in a single unit as shown at 26. These units 26 have suitable supporting standards 27 which are pivotally mounted upon the main flooring of the housing as shown at 28 whereby the nesting units which are normally in position beneath the outer edges of the platform 19 may be swung outwardly from beneath the edges of the platform for the convenience of removing the eggs therefrom, one of the nesting units being illustrated in an outwardly projection position by the dotted lines in Fig. 4. Secured to the uprights 3 adjacent the lower ends thereof are the brackets 29 which have U-shaped extensions 30, the lower edges of which engage the inner edge of the nesting units as shown in Fig. 4. These nesting units are retained in an upright position as shown in Fig. 2 by means of a pivoted button 31 carried by the depending flanges 22 and engaging over the outer wall of the nesting units. The swinging movement of the nesting units is limited by means of stop pins 32 which are carried by the depending flanges 22 and extend into the interior of the nesting units as is clearly illustrated in Fig. 4.

In order to prevent the hens from entering the nesting units at night-time for using them as roosting places, movable bars 33 are provided and are normally supported within the lower ends of the brackets 29 and have connected thereto flexible members 34 which extend thru suitable openings 35 in the flanges 22 whereby a person may grasp the flexible members 34 and due to the inclined outer portion 36 of the brackets 29 any pulling movement on the flexible members 34 will raise the bars 33 upwardly and move them into the U-shaped extensions 30 as illustrated by the dotted lines in Fig. 4, thus preventing the hens from entering the nesting units and using them as roosting places.

It will be apparent from the foregoing that I have provided a simple arrangement whereby a single housing may be quickly and readily converted from a brooding house for small chicks into a laying house for full-grown fowls. The device is comparatively simple in its construction and extremely useful for the purpose intended, and it is believed that the same can be manufauctured and placed upon the market at a comparatively low cost and eliminates the necessity of separate brooding and laying houses as is in brooding and laying houses with which I am familiar prior to my invention.

While I have shown and described the preferred embodiment of my invention, it will be understood that various changes and alterations may be made without departing from the spirit of the invention or the scope of the appended claims.

Having thus described my invention what I claim is:—

1. A device of the character described including a main housing, superposed platforms arranged within the housing, supporting posts at each corner of the platforms, pivotally mounted nesting boxes normally positioned beneath the edges of the uppermost platform, bracket members carried by the posts, each having a U-shaped extension arranged above the entrance of the nesting boxes, movable bars carried by the brackets and adapted to be positioned within said U-shaped extensions for closing the entrance to said nesting boxes.

2. A device of the character described including a main housing, superposed platforms arranged within the housing, the uppermost platform being mounted for movement whereby the same may be raised and lowered with respect to the lowermost platform, means for supporting the uppermost platform in spaced relation with the lowermost platform, heating coils arranged above and below the lowermost platform, a guard flange arranged around the upper heating coil, a movable flexible covering for the lowermost platform and a circular movable platform normally supported upon the upper heating coil.

3. In a device of the character described, a main housing, superposed platforms arranged therein, pivotally mounted nesting boxes supported adjacent the lowermost platform and normally disposed beneath the edges of the uppermost platform and adapted for lateral tilting movement from beneath the edge of the uppermost platform to gain entrance to said nesting boxes, means for retaining said nesting boxes in their normal positions and means for closing the entrance to said nesting boxes.

4. In a device of the character described including a platform, pivotally mounted nesting boxes normally positioned beneath the said platform and adapted for lateral movement from beneath the platform for gaining entrance to said nesting boxes, means for retaining said nesting boxes in their normal positions, means limiting the swinging movement of said boxes beneath the platform upon the release of said retaining means and means for closing the entrance to said nesting boxes.

5. A device of the character described including spaced supporting members, pivotally mounted nesting boxes arranged adjacent said supporting members, said boxes being mounted for lateral tilting movement away from the supporting members, means for retaining said nesting boxes in a normally upright position, means for limiting the movement of said nesting boxes upon the release of the retaining means, spaced brackets carried by the supports and means supported by the brackets for closing the entrance to said nesting boxes.

6. A combination brooding and laying house including a roosting platform, pivotally mounted nesting boxes associated with the platform and mounted for tilting movement laterally thereof, a circular platform having its central portion removed disposed beneath the roosting platform, and heating elements disposed beneath the circular platform.

7. A combination brooding and laying house including a roosting platform, pivotally mounted nesting boxes associated with the platform and mounted for tilting movement laterally thereof, a platform disposed beneath the roosting platform, run boards hingedly connected with the second mentioned platform, and a guard flange carried by the second mentioned platform, portions of said guard flange being disposed over the run boards when the run boards are disposed in substantially the same plane as the second mentioned platform.

8. A combination brooding and laying house including a roosing platform, pivotally mounted nesting boxes associated with the platform and mounted for tilting movement laterally thereof, a platform disposed beneath the roosting platform, run boards hingedly associated with the second mentioned platform, a guard flange carried by the second mentioned platform, portions of said guard flange being disposed over the run boards when the run boards are disposed in substantially the same plane as the second mentioned platform, and heating means disposed beneath and above the second mentioned platform.

9. A combination brooding and laying house including a roosting platform, pivotally mounted nesting boxes associated with the platform and mounted for tilting movement laterally thereof, a platform disposed beneath the roosting platform, run boards hingedly associated with the second mentioned platform, a guard flange carried by the second mentioned platform, portions of said guard flange being disposed over the run boards when the run boards are disposed in substantially the same plane as the second mentioned platform, heating means disposed beneath and above the second mentioned platform, and a platform having its central portion removed disposed above the heating means above the second mentioned platform.

In testimony whereof I affix my signature.

HERMAN F. WHITE.